Oct. 22, 1929.   H. W. A. LEHNERT   1,732,608
MIXING AND DISTRIBUTING VALVE
Filed Sept. 30, 1925   2 Sheets-Sheet 1
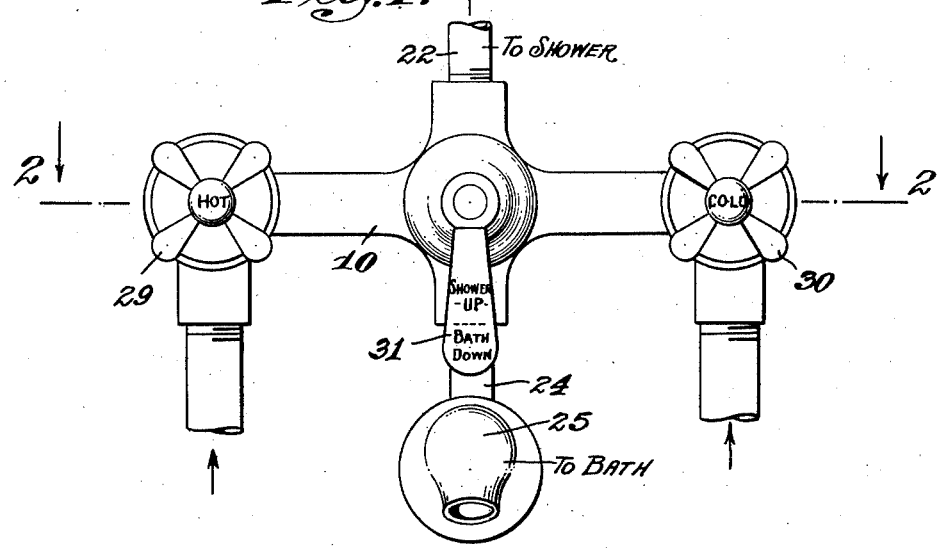
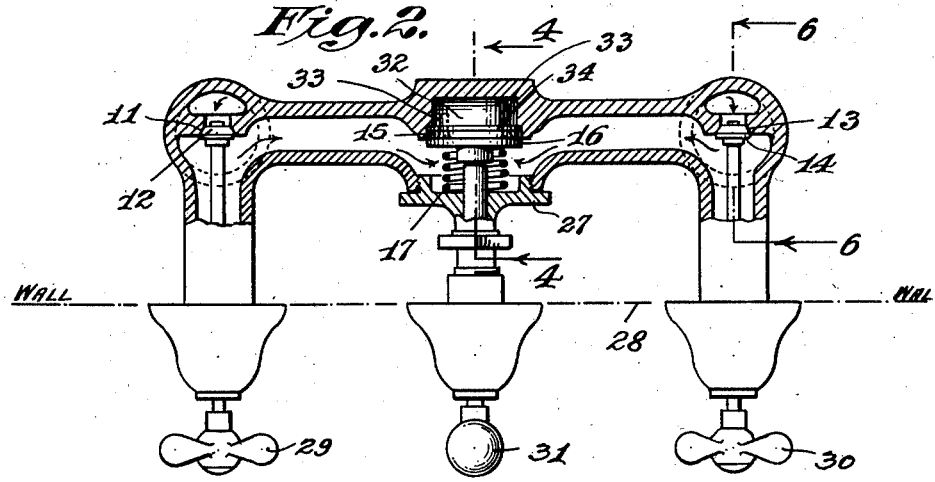
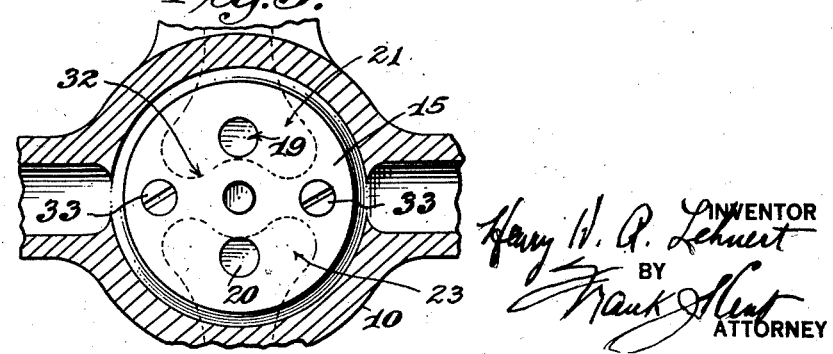

Oct. 22, 1929.  H. W. A. LEHNERT  1,732,608
MIXING AND DISTRIBUTING VALVE
Filed Sept. 30, 1925    2 Sheets-Sheet 2
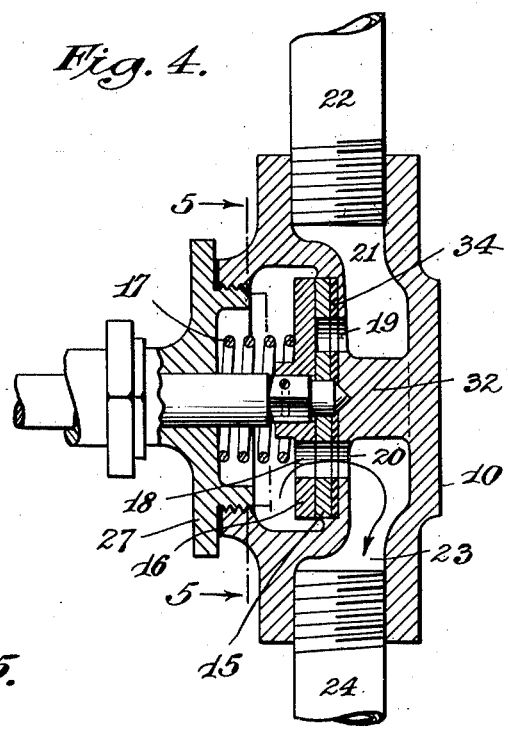
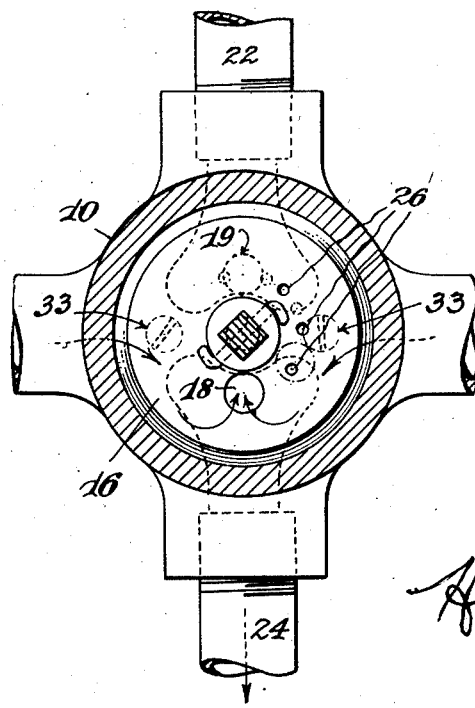
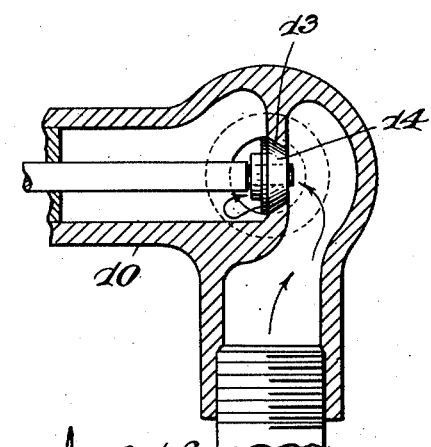

Patented Oct. 22, 1929

1,732,608

UNITED STATES PATENT OFFICE

HENRY W. A. LEHNERT, OF BROOKLYN, NEW YORK

MIXING AND DISTRIBUTING VALVE

Application filed September 30, 1925. Serial No. 59,477.

This invention relates generally to a valve construction suitable for use with bath fitting installations.

One of the objects of the invention is to provide a valve structure by the operation of which hot and cold water can first be mixed in desired proportions and then delivered at different points as desired by the operator.

Another object of the invention is to provide means for indicating, when a valve used to control the delivery of mixed hot and cold water is closed, that either valve controlling the hot or the cold water supply has been left open.

With these and other objects in view the invention includes a unitary or one-piece mixing valve casting in which seats are provided for hot and cold water control valves, and a valve for delivering mixed hot and cold water at a controlled temperature either to an overhead shower fixture, or to a bath tub, as the user may desire.

Another feature of the invention resides in the use of a removable valve seat member which can be replaced when worn. With the removable valve seat member cooperates a disk type valve which is spring-held to the seat and which is used to control the delivery of the mixed water to the desired point.

Still another feature of the invention resides in the provision of bleeder openings so disposed in the disk valve member that one or the other of the holes will invariably register, when the disk valve is closed, with either the shower or the tub supply to provide a drip and indicate if the cold and hot water supply valves have been left open.

Other features of the invention will be hereinafter referred to.

In the drawings, in which a preferred embodiment of the invention has been selected for illustration, Figure 1 is a view in front elevation of a valve assembly and installation embodying the invention.

Figure 2 is a view in horizontal section taken on the line 2—2 of Figure 1.

Figure 3 is a sectional view on an enlarged scale and showing a removable valve seat structure forming part of the invention.

Figure 4 is a sectional view on an enlarged scale taken on the line 4—4 of Figure 2.

Figure 5 is a sectional view taken on the line 5—5 of Figure 4.

Figure 6 is a sectional view on an enlarged scale taken on the line 6—6 of Figure 2.

Referring to the drawings for a more detailed description of the invention, a mixing valve fixture is shown in Figures 1 and 2 which includes a unitary or one-piece casting 10 which provides at one extremity a seat 11 for a hot water supply control valve 12, at the other extremity a seat 13 for a cold water supply control valve 14, and at a mid portion, a removable seat 15 for a disk valve 16. The seat 15 is attached to a web member 32 by means of screws 33. A rubber gasket 34 serves to provide a water-tight engagement of the valve seat with the web member.

The disk valve 16 is held to its seat 15 by means of a spring 17 and a screw-threaded follower 27. A port 18 in the disk is adapted to be moved into cooperative relation or register with either the port 19 or the port 20 in the valve seat 15. The port 19 communicates with a chamber 21 from which a conduit 22 leads to an overhead shower device, while the port 20 communicates with a chamber 23 from which a conduit 24 leads to a bath tub nozzle as at 25.

With the construction described it will be seen that water from the hot and cold water supplies is intermixed and then delivered at either the shower or the tub nozzle as desired.

Another feature of the invention resides in the provision of bleeder openings or ports 26 in the valve disk 16. These ports are so distributed that in the closed position of the disk wherein the port 18 registers with neither port 19 or 20 in the valve seat 15, at least one of the bleeder ports registers with one or the other of the ports 19 or 20 thereby providing a drip at either the shower head or the bath tub nozzle, in the event that the hot and cold water valves 12 and 14 have been left open. It will thus be seen that an indication is provided to show that the hot or cold water supply valves or both have been left open when the distributing valve 16 was closed.

The valve assembly and casting 10 may conveniently be installed within a wall at the face of which the control valve handles 29, 30 and 31 may be placed to control respectively the hot and cold water supply and the distributing valve 16.

What I claim is:—

1. In a mixing valve structure, a hot water supply valve, a cold water supply valve, a distributing valve mounted to deliver mixed hot and cold water received from said hot and cold water supply valves to different points and said distributing valve being provided with a by-pass to permit a restricted flow of water by the valve in closed position to indicate when the hot and cold water supply valves have been left open.

2. In a mixing valve structure, a hot water supply valve, a cold water supply valve, a distributing valve mounted to deliver mixed hot and cold water received from said hot and cold water supply valves to different points, said distributing valve being of the disk type, said disk valve being provided with bleeder holes to provide for the passage of a dripping supply of water therethrough in a closed condition of the valve, whereby an indication will be given when the hot and cold water supply valves have been left open.

3. In a mixing valve structure, a unitary chambered member, a hot water supply valve mounted in one end of said member, a cold water supply valve mounted in the other end of the member, a distributing valve mounted in said member intermediate said hot and cold water supply valves, said distributing valve being of the disk type and arranged to distribute mixed hot and cold water to different points, the valve seat for said disk valve being removable, and said disk valve being provided with bleeder ports to permit a dripping supply of water to pass in the closed position of the valve, whereby to indicate that the hot and cold water supply valves have been left open.

4. In a mixing valve structure, a hot water supply valve, a cold water supply valve, a distributing valve mounted to deliver mixed hot and cold water received from said hot and cold water supply valves to different points, and said distributing valve being minutely apertured to permit a restricted flow of water through the valve in closed position to indicate when the hot and cold water supply valves have been left open.

5. A mixing valve comprising a chambered casing, partitions separating the central part of the casing into a forward mixing chamber and a plurality of rear delivery chambers, the partition being provided with a port for each delivery chamber, the ports leading from the mixing chamber to the delivery chambers, a disc valve in the mixing chamber and seating on the partition, the disc valve being provided with a discharge port for registry with the ports in the partition, said disc valve being provided with a minute orifice to detect leakage into the mixing chamber, a valved passage for conducting hot water to the mixing chamber, and a valved passage for conducting cold water to the mixing chamber.

6. A mixing valve comprising a chambered casing, partitions separating the central part of the casing into a forward mixing chamber and a plurality of rear delivery chambers, the partition being provided with a port for each delivery chamber, the ports leading from the mixing chamber to the delivery chambers, a removable seat on the partition, a disc valve in the mixing chamber and seating on the partition, the disc valve being provided with a discharge port for registry with the ports in the partition, said disc valve being provided with a minute orifice to detect leakage into the mixing chamber, a stem extending through the mixing chamber and operatively connected to the disc valve, a spring surrounding the stem, a cap surrounding the stem and pressing the spring against the valve, a valved passage for conducting hot water to the mixing chamber, and a valved passage for conducting cold water to the mixing chamber.

In testimony whereof I affix my signature.

HENRY W. A. LEHNERT.